United States Patent Office 3,749,800
Patented July 31, 1973

3,749,800
STABLE COMPOSITION FOR DISPENSING $PGE_2$
Randall G. Stehle and Thomas O. Oesterling, Kalamazoo,
Mich., assignors to The Upjohn Company, Kalamazoo,
Mich.
No Drawing. Filed Nov. 1, 1971, Ser. No. 194,104
Int. Cl. A61k 27/00
U.S. Cl. 424—318    7 Claims

ABSTRACT OF THE DISCLOSURE $PGE_2$ is successfully dispensed for enteral or parenteral administration, especially for intravenous infusion, by preparing a concentrated stock solution in an anhydrous, water-miscible, pharmacologically-acceptable alcohol; storing the stock solution at a temperature low enough to prevent excessive dehydration; and, prior to administration, diluting the stock solution into a liquid or solid vehicle. For intravenous infusion the stock solution is sterilized.

BRIEF DESCRIPTION OF THE INVENTION

This invention relates to a method of dispensing $PGE_2$, or a racemate thereof, for enteral or parenteral administration, especially for intravenous infusion, which comprises preparing a concentrated stock solution of the $PGE_2$ in an anhydrous, water-miscible, pharmacologically-acceptable alcohol; sterilizing the solution when intended for parenteral administration; storing the stock solution at a temperature low enough to prevent excessive dehydration; and prior to administration, diluting said stock solution into a liquid or solid vehicle, and administering the vehicle to administer a therapeutic dose.

The invention also relates to a stable, concentrated solution of such $PGE_2$ in an anhydrous, water-miscible, pharmacologically-acceptable alcohol suitable for dilution into a liquid or solid vehicle, especially such solutions that contain not more than 0.5% water.

BACKGROUND $PGE_2$ has the formula

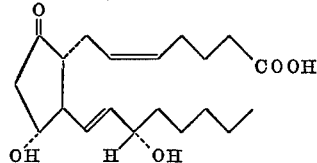

It is effective for inducing labor or for effecting therapeutic abortions. It is unstable, however, and tends to run down by dehydration to $PGA_2$ which has the formula

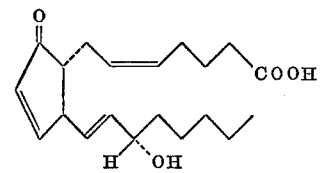

It has been necessary, therefore, to store $PGE_2$ and stock solutions thereof at very low temperatures, for example minus 20° C. or lower, to minimize dehydration to $PGA_2$.

DESCRIPTION OF THE INVENTION

It has now been found that this tendency to $PGE_2$ to run down, due to dehydartion to $PGA_2$ on storing in solution, can be deterred using an anhydrous, water-miscible, pharmacologically-acceptable alcohol to prepare a stock solution. Stock solutions of $PGE_2$ so prepared, i.e., in a pharmacolgcially-acceptable, anhydrous, water-miscible alcohols, for example, anhydrous alcohol, can be stored at relatively high temperatures, for example, up to 4° or so, depending upon the alcohol and the water content thereof, for relatively long periods of time, for example, 1 year or so, without excessive run down due to dehydration to $PGA_2$. Such solutions, therefore, when sterilized, for example, by filter sterilization, provide a satisfactory method for dispensing $PGE_2$ for administration parenterally, for example, sterile infusion or by injection into the amniotic sac, or when not sterilized for dilution into water for enteral administration or into lactose tablets or suppository base for intravaginal administration.

$PGE_2$ as used herein refers to parenteral grade $PGE_2$, i.e., $PGE_2$ sufficiently pure for parenteral administration (U.S. Pat. 3,598,858). Even this pure material is subject to run down showing that dehydration is an inherent characteristic of the compound.

While anhydrous ethanol is given by way of illustration, it is to be understood that other water-miscible, pharmacologically-acceptable alcohols can be used. Suitable such other alcohols include isopropanol, 1,3-butanediol, propylene glycol, polyethylene glycol 300, and polyethylene glycol 400.

By water-miscible is intended those alcohols which mix with water in all proportions or which are so highly soluble in water that they behave as if they were completely miscible.

It is desirable that the solutions according to the invention be relatively concentrated, i.e. concentrated relative to the effective concentration, i.e., the concentration at which the drug is used. Thus with ethanol or 1,3-butanediol, or like water-miscible alcohol, the concentration could be as high as 100 mg./ml. or so. Ordinarily it will be sufficient if the solute is present in at least about 1 mg./ml. Such solutions, though seemingly dilute, are relatively quite concentrated with respect to the effective concentration.

It is to be understood that pharmacologically-acceptable is to be based on the liquid or solid vehicle rather than on the stock solution. Some anhydrous solvents, for example, might not be pharmacologically-acceptable undiluted as in the stock solution but is very much so when diluted with a large volume of water as in enteral or parenteral administration or when diluted into a lactose tablet or suppository base for intravaginal administration. For example, 1 ml. of a 50 mg./ml. solution of $PGE_2$ diluted into 1 liter of infusion solution gives a solution containing 0.005% $PGE_2$. At the same time the concentration of the solvent, 0.1%, is well below that safe for intravenous infusion. Thus a pharmacologically-acceptable alcohol as used herein is one which on dilution into the liquid or solid vehicle causes no untoward pharmacodynamic effect.

An anhydrous alcohol solution is to be considered as one containing not more than 1.0% of water. All commercially available solvents contain water. Ordinary pure anhydrous ethanol may contain up to about 1.0% water whereas "distilled in glass" grade may contain as little as 0.5% water or less. An anhydrous alcohol, therefore, is to be considered as one containing not more than about 1.0% water. The Karl Fischer method can be used to determine the water content.

The formula given above for $PGE_2$ is stereospecific. It designates the naturally occurring form identified in U.S. Pat. 3,598,858. Synthesis of $PGE_2$ sometimes gives a racemic mixture of $PGE_2$ and its mirror image. It is not necessary to isolate the $PGE_2$ from such racemic mixtures. Such mixtures are therefore within the scope of the invention.

The invention can now be more fully understood by reference to the following examples in which the parts and percentages are by weight and the units in the C.G.S. system unless otherwise specified.

Example 1

Parenteral grade $PGE_2$ is dissolved in anhydrous ethanol containing 0.75% water (determined by the Karl Fischer method) in the proportions of 5 mg. $PGE_2$ for each ml. of anhydrous ethanol. The solution is then filter sterilized by passing it through a microporous (solvent-resistant) filter, e.g., Millipore Solvinert 0.25 micron or Gelman Metricel Alpha-8, 0.2 micron, aseptically packaged in 1 ml. quantities in sterile ampuls and kept under refrigeration at not more than 5° until needed. At that time the contents of one ampul (1 ml.) are diluted into 1 l. of infusion solution and administered intravenously at the rate of 5 mcg. of $PGE_2$ per minute. This regimen is intended for therapeutic abortion.

Example 2

Parenteral grade $PGE_2$ is dissolved in "distilled in glass" anhydrous ethanol (0.5% water) in a concentration of 5 mg. per ml. The solution is filter sterilized as in Example 1 and packaged aseptically in 1 ml. quantities in sterile ampuls. This solution can be stored at room temperature. It is administered in the same way and for the same purposes as in Example 1.

Example 3

Parenteral grade $PGE_2$ is dissolved in "distilled in glass" anhydrous ethanol (0.5% water) in the proportions of 0.75 mg. $PGE_2$ to 1.5 ml. anhydrous ethanol. The solution is then filter sterilized as in Example 1, aseptically packaged in 1.5 ml. quantities in sterile ampuls, and kept under refrigeration at not more than 5° until needed. It is administered by diluting the contents of 1 ampul (1.5 ml.) into 150 ml. of infusion solution and administered intravenously at the rate of 0.5 mcg. of $PGE_2$ per minute. This regimen is intended for inducing labor.

We claim:

1. A process for dispensing $PGE_2$, or a racemate thereof, which comprises dissolving the $PGE_2$, or racemate thereof, in an anhydrous, water-miscible, pharmacologically-acceptable alcohol containing not more than 1.0% water, in a concentration of at least 1 mg./ml.; packaging it in unit dose containers; diluting the contents of a container into a liquid or solid vehicle and administering said vehicle to administer a therapeutic dose.

2. The process of claim 1 in which the solvent is anhydrous ethanol containing not more than 0.5% water.

3. A process for dispensing $PGE_2$, or a racemate thereof, which comprises dissolving the $PGE_2$, or racemate thereof, in an anhydrous, water-miscible, pharmacologically-acceptable alcohol containing not more than 1.0% water, in a concentration of at least 1 mg./ml.; filter sterilizing the resulting solution; aseptically packaging it in sterile containers with a sterile miscible diluent; and administering the solution at a rate to administer a therapeutic dose.

4. The process of claim 3 in which the solvent is anhydrous ethanol containing not more than 0.5% water.

5. A solution comprising $PGE_2$, or a racemate thereof, in an anhydrous, water-miscible, pharmacologically-acceptable alcohol containing not more than 1.0% water in a concentration of at least 1 mg./ml.

6. A solution according to claim 5 in which the solvent is anhydrous ethanol containing not more than 0.5% water.

7. A solution according to claim 6 which is sterile.

OTHER REFERENCES

Brummer: J. Pharm. & Pharmacol., vol. 23, No. 10 (October 1971), Letter dated June 10, 1971.

SAM ROSEN, Primary Examiner

UNITED STATES PATENT OFFICE
CERTIFICATE OF CORRECTION

Patent No. 3,749,800         Dated July 31, 1973

Inventor(s) Randall G. Stehle and Thomas O. Oesterling

It is certified that error appears in the above-identified patent and that said Letters Patent are hereby corrected as shown below:

Column 1, line 68, "tendency to $PGE_2$" should read -- tendency of $PGE_2$ --; line 69, "dehydartion" should read -- dehydration --.

Column 2, line 61, "0.54 water of less" should read -- 0.5%

Signed and Sealed this ninth Day of August 1977

[SEAL]

Attest:

RUTH C. MASON
Attesting Officer

C. MARSHALL DANN
Commissioner of Patents and Trademarks